(12) United States Patent
Kent

(10) Patent No.: US 7,000,474 B2
(45) Date of Patent: Feb. 21, 2006

(54) ACOUSTIC DEVICE USING HIGHER ORDER HARMONIC PIEZOELECTRIC ELEMENT

(75) Inventor: Joel C. Kent, Fremont, CA (US)

(73) Assignee: ELO Touchsystems, Inc., Menlo Park, CA (US)

( * ) Notice: Subject to any disclaimer, the term of this patent is extended or adjusted under 35 U.S.C. 154(b) by 0 days.

(21) Appl. No.: 10/377,493

(22) Filed: Feb. 28, 2003

(65) Prior Publication Data

US 2004/0168516 A1 Sep. 2, 2004

(51) Int. Cl.
*G01N 29/12* (2006.01)
*H01L 41/18* (2006.01)
*G09G 5/00* (2006.01)

(52) U.S. Cl. .................. 73/579; 345/173; 310/313 R
(58) Field of Classification Search .................. 73/579, 73/862.59; 310/313; 345/177, 173; 178/18.04, 178/18.01, 18.03
See application file for complete search history.

(56) References Cited

U.S. PATENT DOCUMENTS

| | | |
|---|---|---|
| 4,642,423 A | 2/1987 | Adler |
| 4,644,100 A | 2/1987 | Brenner et al. |
| 4,645,870 A | 2/1987 | Adler |
| 4,700,176 A | 10/1987 | Adler |
| 4,746,914 A | 5/1988 | Adler |
| 4,791,416 A | 12/1988 | Adler |
| 4,825,212 A | 4/1989 | Adler et al. |
| 4,859,996 A | 8/1989 | Adler et al. |
| 4,880,665 A | 11/1989 | Adler et al. |
| RE33,151 E | 1/1990 | Adler |
| 5,072,427 A | 12/1991 | Knowles |
| 5,162,618 A | 11/1992 | Knowles |
| 5,177,327 A | 1/1993 | Knowles |
| 5,243,148 A * | 9/1993 | Knowles .................. 178/18.04 |
| 5,260,521 A | 11/1993 | Knowles |
| 5,329,070 A | 7/1994 | Knowles |
| 5,573,077 A | 11/1996 | Knowles |
| 5,591,945 A | 1/1997 | Kent |
| 5,708,461 A * | 1/1998 | Kent ......................... 345/177 |
| 5,739,479 A | 4/1998 | Davis-Cannon et al. |
| 5,854,450 A | 12/1998 | Kent |
| 5,856,820 A | 1/1999 | Weigers et al. |
| 5,986,224 A | 11/1999 | Kent |
| 6,054,797 A * | 4/2000 | Wajima et al. ............... 310/320 |
| 6,078,315 A * | 6/2000 | Huang ......................... 345/177 |
| 6,087,499 A | 7/2000 | Tokoyoda et al. |
| 6,091,406 A | 7/2000 | Kambara et al. |
| 6,225,985 B1 | 5/2001 | Armstrong et al. |
| 6,236,691 B1 | 5/2001 | Johnson |
| 6,369,487 B1 * | 4/2002 | Kameda et al. ............. 310/320 |
| 6,441,809 B1 | 8/2002 | Kent et al. |

* cited by examiner

*Primary Examiner*—Thomas P. Noland
*Assistant Examiner*—Jacques M. Saint-Surin

(57) ABSTRACT

An acoustic-based system, such as a touchscreen system, is provided. The system comprises an acoustic substrate and an acoustic transducer operably coupled to the substrate. The transducer exhibits a higher order odd resonant frequency that is equal to the operating frequency of the system. As a result of using the higher resonant frequency that is substantially equal to the operating frequency, the thickness of the transducer can be increased, and thus made more durable.

20 Claims, 10 Drawing Sheets

Lowest-order thickness resonance

ZOHPS Waves

HOHPS Waves

LOVE Waves

Wedge Transducer

Edge Transducer

Grating Transducer

Wedge Transducer

Fundamental Shear Mode

Third harmonic shear mode

| Piezo Material | Harmonic Number | Observed Love-Wave Signal Amplitude |
|---|---|---|
| Lithium Niobate | 1st (lowest) Mode | 47mV |
| PZT | 3rd-Harmonic | 69mV |

ACOUSTIC DEVICE USING HIGHER
ORDER HARMONIC PIEZOELECTRIC
ELEMENT

FIELD OF THE INVENTION

The field of the present invention relates to acoustic touch sensor technology, and more particularly to acoustic touch sensors utilizing higher order frequencies of piezoelectric elements.

BACKGROUND OF THE INVENTION

Touch sensors are transparent or opaque input devices for computers and other electronic systems. As the name suggests, touch sensors are activated by touch, either from a user's finger, or a stylus or some other device. Touchscreens (i.e., touch sensors having a transparent substrate) are generally used in conjunction with display devices, such as cathode ray tube (CRT) monitors and liquid crystal displays, to create touch display systems. These systems are increasingly used in commercial applications such as restaurant order entry systems, industrial process control applications, interactive museum exhibits, public information kiosks, pagers, cellular phones, personal digital assistants, and video games.

The dominant touch technologies presently in use are resistive, capacitive, infrared, and acoustic technologies. Touchscreens incorporating these technologies have delivered high standards of performance at competitive prices. All are transparent devices that respond to a touch by transmitting the touch position coordinates to a host computer, which in turn implements some function associated with the particular position coordinates. Each has, of course, relative strengths and weaknesses.

Acoustic touchscreens, also known as ultrasonic touchscreens, have competed effectively with the other touch technologies. This is due in large part to the ability of acoustic touchscreens to handle demanding applications with high transparency and high resolution touch performance, while providing a durable touch surface.

Acoustic touchscreen systems comprise a touchscreen (i.e., a touch sensor having a transparent substrate), a controller and leads coupling the touchscreen and the controller. Typically, the touchscreen comprises a touch sensitive substrate in which an acoustic wave is propagated. When a touch occurs on the substrate surface, it results in the absorption of at least a portion of the wave energy being propagated across the substrate. Electronic circuitry is used to locate the absorption position in an XY coordinate system that is conceptually and invisibly superimposed onto the touchscreen. In essence, this is accomplished by recording the time the wave is initially propagated and the time at which the touch induced wave absorption occurs. The difference in these times can then be used, together with the known speed of the wave through the substrate, to determine the precise location of the touch.

A common type of acoustic touchscreen employs Rayleigh type acoustic waves—where the term is intended to include quasi-Rayleigh waves. Illustrative disclosures relevant to Rayleigh wave touchscreens include U.S. Pat. Nos. 4,642,423; 4,645,870; 4,700,176; 4,746,914; 4,791,416; Re 33,151; 4,825,212; 4,859,996; 4,880,665; 4,644,100; 5,739,479; 5,708,461; 5,854,450; 5,986,224; 6,091,406; 6,225,985; 6,236,691; and 6,441,809. Acoustic touchscreens employing other types of acoustic waves such as Lamb or shear waves, or combinations of different types of acoustic waves (including combinations involving Rayleigh waves) are also known. Illustrative disclosures of these technologies include U.S. Pat. Nos. 5,591,945; 5,854,450; 5,072,427; 5,162,618; 5,177,327; 5,329,070; 5,573,077; 6,087,599; 5,260,521; and 5,856,820. The above cited patents are hereby incorporated by reference into this application.

Acoustic touchscreens that sense touch via the absorption of Rayleigh waves have proved to be commercially successful. The success of products using Rayleigh waves is due in large part to two properties exhibited by Rayleigh waves. First, Rayleigh waves are more sensitive to touch than are other acoustic waves. Second, Rayleigh waves are surface waves that can propagate on the surface of any simple homogenous glass substrate. However, Rayleigh wave touchscreens have increased sensitivity to liquid contaminants such as oil and water, which absorb energy from the propagating waves.

While Rayleigh waves are most commonly used in commercial products, touchscreens using horizontally polarized shear waves are also well known in the art. The use of horizontally polarized shear waves greatly enhances the robustness of acoustic touchscreen operation in the presence of water and other liquid contaminants. This is due to the fact that unlike Rayleigh waves, horizontally polarized shear waves have no vertical motion component to be absorbed by a contaminant. Therefore, wave absorption occurs through viscous damping rather than wave radiation. Since a finger is more viscous than a contaminant such as a water drop, the touchscreen can be configured to reject lower viscosity touches, thus rejecting contamination, while accepting higher viscosity valid finger touches. Thus, contaminant immunity is an important benefit of horizontally polarized shear waves for certain touchscreen applications.

Whichever type of acoustic technology is used, the acoustic touchscreen comprises transducers, which are elements that convert energy from one form to another. For example, a transmit transducer receives a tone burst from associated electronic circuitry and then emits an acoustic wave packet across a substrate. A receive transducer receives the transmitted acoustic wave packet from the substrate and generates an electronic signal that is transmitted to associated electronic circuitry for processing. Each type of transducer includes a piezoelectric element to transform the electronic signals and mechanical vibrations. Commercial piezoelectric elements are most commonly manufactured from ferroelectric piezoelectric ceramics, such as lead zirconium titanium (PZT) and modified lead titanate. While typically more expensive, mono-crystalline piezoelectric materials, such as lithium niobate, may also be used to construct piezoelectric elements for touchscreen transducers.

Most commercially produced piezoelectric elements are pressure mode piezoelectric elements. However, if the transducer is to transmit or receive a horizontally polarized shear wave, a shear mode piezoelectric element is required. FIGS. 1(a) and (b) schematically show time sequences for piezoelectric element vibrations: FIG. 1(a) shows the time sequence for a pressure mode piezoelectric element and FIG. 1(b) shows the sequence for a shear mode piezoelectric element. In FIG. 1(a), the pressure mode piezoelectric element begins at rest 10. It then receives an electric signal, which causes it to expand to position 12. After the piezoelectric element has reached its fully expanded position 12, it will contract toward its rest position 14. It continues to contract past the rest position 14 until it reaches its fully contracted position 16. Finally, after reaching its fully contracted position 16, it returns to its rest position 18, thus completing the cycle. As a result of this vibrational contraction/expansion movement of the piezoelectric element, acoustic waves are generated through a series of vibrational cycles. In FIG. 1(b), the shear mode. piezoelectric element begins at rest 20. It then receives an electric signal, which causes it to shear to position 22. After the piezoelectric element has reached its fully sheared position 22, it will shear in the opposite direction towards its rest position 24. It continues to shear past the rest position 24 until it reaches a fully sheared position 26. Finally, after reaching its fully sheared position 26, it returns to its rest position 28, thus completing the cycle. As a result of this vibrational shearing movement of the piezoelectric element, acoustic waves are generated through a series of vibrational cycles.

In essence, acoustic touchscreens are simply bandpass filter systems. In other words, if a plurality of different frequency signals are input into the touchscreen, the touchscreen will only output a particular one of those signals. This particular signal will have a specific frequency which is known as the operating frequency of the touchscreen. For example, if a series of signals at between 1 and 10 MHz (1, 2, 3, etc.) are input into a particular touchscreen, the touchscreen will only output a signal at one of those frequencies, for example 5 MHz. This frequency (the operating frequency) is defined by the material of the touchscreen substrate (which defines the velocity of the signal through the substrate) and the spacing between reflective elements of a reflective array of the touchscreen (the spacing must be an integer multiple of the wavelength of the signal). Based upon the foregoing, the other elements of the touchscreen are designed for use at the operating frequency. Conventionally, associated electronics drive the touchscreen with tone bursts at this operating frequency, acoustic waves are generated, propagated and received at this operating frequency, and associated electronics process received electronic signals at this operating frequency.

Commercial acoustic touchscreen systems are typically designed having an operating frequency close to 5 MHz. Attenuation rates of acoustic waves increase rapidly with increasing frequency. For example, an operating frequency of 10 MHz would greatly reduce the maximum propagation distance, and hence limit the touchscreen to sizes too small for many applications of commercial interest, although higher operating frequencies may be useful for smaller touchscreens, such as those found in PDA, mobile phones, etc. On the other hand, use of a much lower operating frequency leads to larger acoustic wavelengths, stronger diffraction effects, and less well-directed acoustic beams. This means that wider reflective array borders are required. Ultimately, using lower operating frequencies leads to reduced touch position resolution. Thus, operating frequencies close to 5 MHz are the commercial standard.

In general, piezoelectric elements are designed to resonate at the operating frequency of the touchscreen system, to ensure acceptable levels of efficiency. In conventional acoustic touchscreen piezoelectric elements, the fundamental or first order thickness mode resonance of the piezoelectric element is at least approximately matched to the touchscreen system's operating frequency. This condition is equivalent to requiring that the piezoelectric element thickness be one-half of the bulk wave wavelength in the piezoelectric material. This is illustrated in FIG. 2, which shows the piezoelectric element thickness, T, for a first-order thickness resonance mode. This resonance condition determines the thickness of the piezoelectric elements according to the formula $$T = \frac{\lambda}{2} = \frac{V}{2f} = \frac{N}{f},$$

where T is the piezoelectric element thickness, λ is the wavelength of the relevant bulk wave in the piezoelectric material, V is the speed of sound of the relevant bulk wave in the piezoelectric material, and f is the resonance frequency of the piezoelectric element. For convenience, manufacturers of piezoelectric elements often define half the speed of sound within the relevant piezoelectric material to be the frequency constant N.

Transducers designed to generate Rayleigh waves in a touchscreen substrate generally require a pressure mode piezoelectric element. For pressure mode piezoelectric elements, the relevant bulk wave is the bulk pressure wave. For a typical PZT material, the frequency constant for pressure-mode vibrations is typically in the neighborhood of N=2000 m*Hz. Thus, for a typical touchscreen operating frequency of approximately 5 MHz, this leads to a piezoelectric element thickness of about T=400 μm for pressure mode piezoelectric elements. While such thin slabs of piezoelectric ceramic material are rather fragile and easily broken, they are routinely manufactured and used in touchscreen assembly without serious problems, provided they are given proper care and handling.

The situation is much different, however, for shear mode piezoelectric elements. Transducers designed to generate horizontally polarized shear waves in a touchscreen substrate generally require a shear mode piezoelectric element. For shear mode piezoelectric elements, the relevant speed of sound is the bulk shear wave velocity in the piezoelectric material. Due to the dramatically slower velocity of shear waves relative to pressure waves, typical PZT frequency constants for shear mode vibrations are in the neighborhood of N=900 m*Hz. This leads to a piezoelectric element thickness of approximately T=180 μm, less than half the thickness of the corresponding pressure mode piezoelectric element.

The break strength of a slab varies with the square of its thickness. Therefore, since $$\frac{180^2}{400^2} \approx 0.20,$$

a 180 μm thick shear mode piezoelectric element will break with about one-fifth of the force required to break a 400 μm thick pressure mode piezo. As a result, while 5 MHz pressure-mode PZT piezoelectric elements are strong enough for routine piezoelectric element manufacture and transducer assembly, the much weaker 5 MHz shear mode PZT piezoelectric elements are too fragile for these purposes. Therefore, while lithium niobate shear mode piezoelectric elements are more expensive then PZT elements, they provide better strength characteristics then PZT elements.

For a given frequency, lithium niobate piezoelectric elements are somewhat thicker and stronger than the corresponding PZT piezoelectric elements. Nevertheless, shear mode lithium niobate piezoelectric elements at 5 MHz are still very fragile. More importantly, mono-crystalline lithium niobate is a more expensive piezoelectric material than ferroelectric ceramic materials, such as PZT and lead titanate. In addition, PZT has stronger piezoelectric coupling constants than lithium niobate does. Therefore, were it not for the fragileness problem, PZT shear mode piezoelectric elements would be more beneficial than lithium-niobate piezoelectric elements in touchscreen applications.

As new applications develop for handheld computers with touchscreens, there may be market opportunities for smaller acoustic touchscreens with smaller sizes, higher operating frequencies, and hence thinner piezoelectric elements. This may lead to fragileness problems even for pressure-mode PZT piezoelectric elements.

Acoustic touch sensor applications need not be limited to transparent touchscreens placed in front of displays. Opaque sensors of various sizes and shapes may be considered. For example, in robotic applications, collision detection may be provided by tiling the exposed surfaces of a robot with touch sensors. The fragileness of thin PZT piezoelectric elements places undesired constraints on the choice of operating frequencies for such acoustic touch sensor systems.

Accordingly, there is a significant need to improve the design of acoustic transducers, particularly shear mode transducers, so that they can be made thicker, and thus more durable.

SUMMARY OF THE INVENTION

In accordance with a first aspect of the present inventions, an acoustic touch sensor having an operating frequency is provided. The touch sensor can be used in an technology that requires the ability to sense touches, including but not limited to touchscreen, touch pad, and touch sensitive robotic technologies. The acoustic sensor comprises a touch sensitive substrate, which can either be transparent or opaque, and at least one piezoelectric element that is operably coupled to the substrate, e.g., as a wedge, edge, or grating transducer. The piezoelectric element is characterized by a higher order odd resonant frequency (e.g., third, fifth, seventh, etc.) approximately equal to the operating frequency of the acoustic touch sensor. Although the present inventions should not necessarily be so-limited in their broadest aspects, the use of a higher order odd resonant frequency, allows the thickness of the piezoelectric element to be increased, thereby increasing its durability.

The piezoelectric element can be composed of any type of material that transforms electrical energy to acoustic energy, and vice versa. For example, the piezoelectric element can comprise ceramic material, such as lead zirconium titantate (PZT) or lead titanate. The piezoelectric element can also comprise mono-crystalline piezoelectric materials, such as lithium niobate. The piezoelectric element can be operated as a shear mode piezoelectric element in order to transmit or receive horizontally polarized acoustic shear waves (e.g., Love wave, a Zero Order Horizontally Polarized Shear (ZOHPS) wave, or a Higher Order Horizontally Polarized Shear (HOHPS) wave) in the touch sensor substrate or as a pressure-mode piezoelectric element in order to transmit or receive waves with a longitudinal component (e.g., Rayleigh and Lamb waves) in the touch sensitive substrate. The use of higher order resonant frequencies, however, has a more significant beneficial impact when using shear mode piezoelectric ceramic material because these types of material would be too thin to manufacture if designed to have a fundamental resonance frequency equal to the operating frequency of the touch sensor.

In a preferred embodiment, there are two acoustic transducers. One of the piezoelectric elements is a transmitting piezoelectric element and the other is a receiving piezoelectric element that is also operably coupled to the touch sensitive substrate and likewise exhibits a higher order odd resonant frequency approximately equal to the operating frequency. In the preferred embodiment, the touch sensor further comprises a transmit/receive assembly for transmitting and receiving acoustic waves along at least one set of paths. The piezoelectric elements in the transmit/receive assembly, including the previously discussed piezoelectric element, may be characterized by a higher order odd resonant frequency that is approximately equal to the operating frequency of the acoustic sensor.

In accordance with a second aspect of the present inventions, a method of sensing touches on a touch sensor having an operating frequency is provided. The method comprises providing a touch sensor that operates at a fundamental resonance frequency and a higher order resonant frequency substantially equal to the operating frequency, generating an acoustic wave having the fundamental resonance frequency and higher order resonant frequencies, and transmitting the acoustic wave across an acoustic substrate. The method further comprises receiving the acoustic wave from the substrate, and processing it at the higher order resonant frequency to determine whether the substrate has been touched. The acoustic wave can be a horizontally polarized acoustic shear wave (e.g., a Love, ZOHPS, or HOHPS wave) or the wave can be a wave with a longitudinal component (e.g., a Rayleigh or Lamb wave).

In accordance with a third aspect of the present inventions, an acoustic-based system having an operating frequency is provided. The system comprises an acoustic substrate, and a piezoelectric element operably coupled to the substrate, wherein the piezoelectric element has a higher order odd resonant frequency approximately equal to the operating frequency. The system can have many of the same features described above with respect to the touch sensor, except that it is not limited to touch sensor technology, but rather can be applied to other types of technologies in which it is desirable transmit and receive acoustic waves propagating along surfaces.

In accordance with a fourth aspect of the present inventions, a method of using an acoustic substrate having an operating frequency is provided. The method comprises providing an acoustic substrate, providing a transducer comprising a piezoelectric element coupled to the substrate that operates at a fundamental resonance frequency and a higher order resonant frequency substantially equal to the operating frequency, generating an acoustic wave having the fundamental resonance frequency and higher order resonant frequencies, transmitting the acoustic wave across the acoustic substrate. The method, further comprises receiving the acoustic wave from the substrate, and processing the acoustic wave at the higher order resonant frequency. The method can have many of the same features described above with respect to the touch sensor method, with the exception that it is not limited to touch sensor technology.

BRIEF DESCRIPTION OF THE DRAWINGS

The drawings illustrate the design and utility of a preferred embodiment of the present invention, in which similar elements are referred to by common reference numerals. In order to better appreciate the advantages and objects of the present invention, reference should be made to the accompanying drawings that illustrate this preferred embodiment. However, the drawings depict only one embodiment of the invention, and should not be taken as limiting its scope. With this caveat, the invention will be described and explained with additional specificity and detail through the use of the accompanying drawings in which.

DETAILED DESCRIPTION OF THE PREFERRED EMBODIMENTS

Figure 1A:
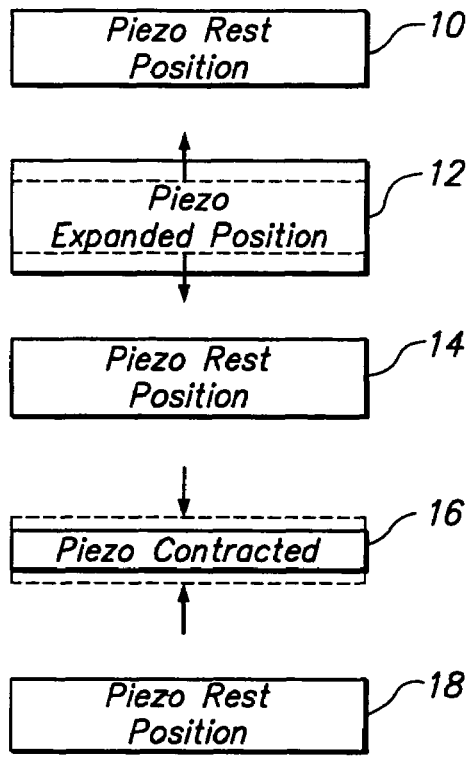
FIGS. 1(a)–(b) are time sequences of piezoelectric element vibrations for prior art pressure mode and shear mode piezoelectric elements, respectively.
Figure 1B:
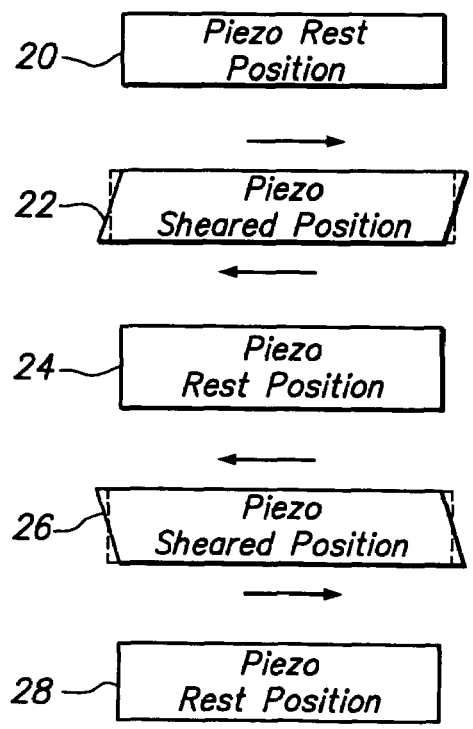
Figure 2:
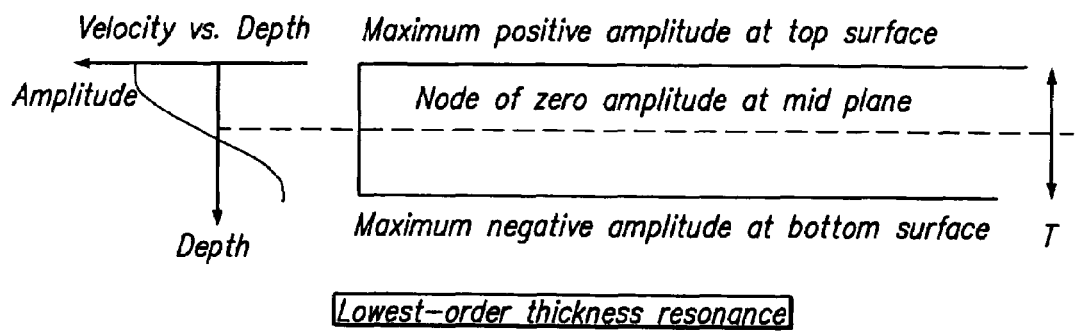
FIG. 2 is a diagram illustrating the velocity-versus-depth relationship for an exemplary piezoelectric element excited at the lowest order resonance.
Figure 3:
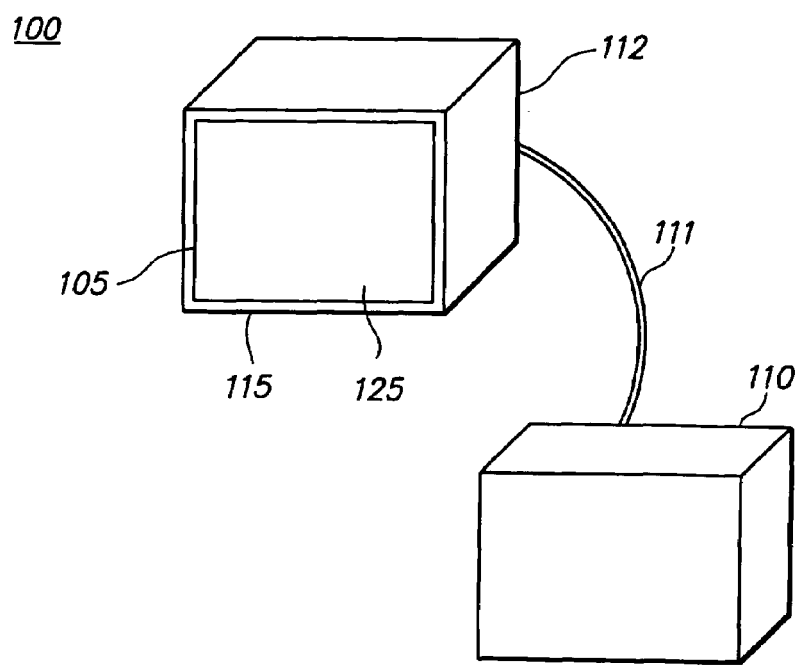
FIG. 3 is an acoustic touchscreen system constructed in accordance with one embodiment of the present invention.
Figure 4:
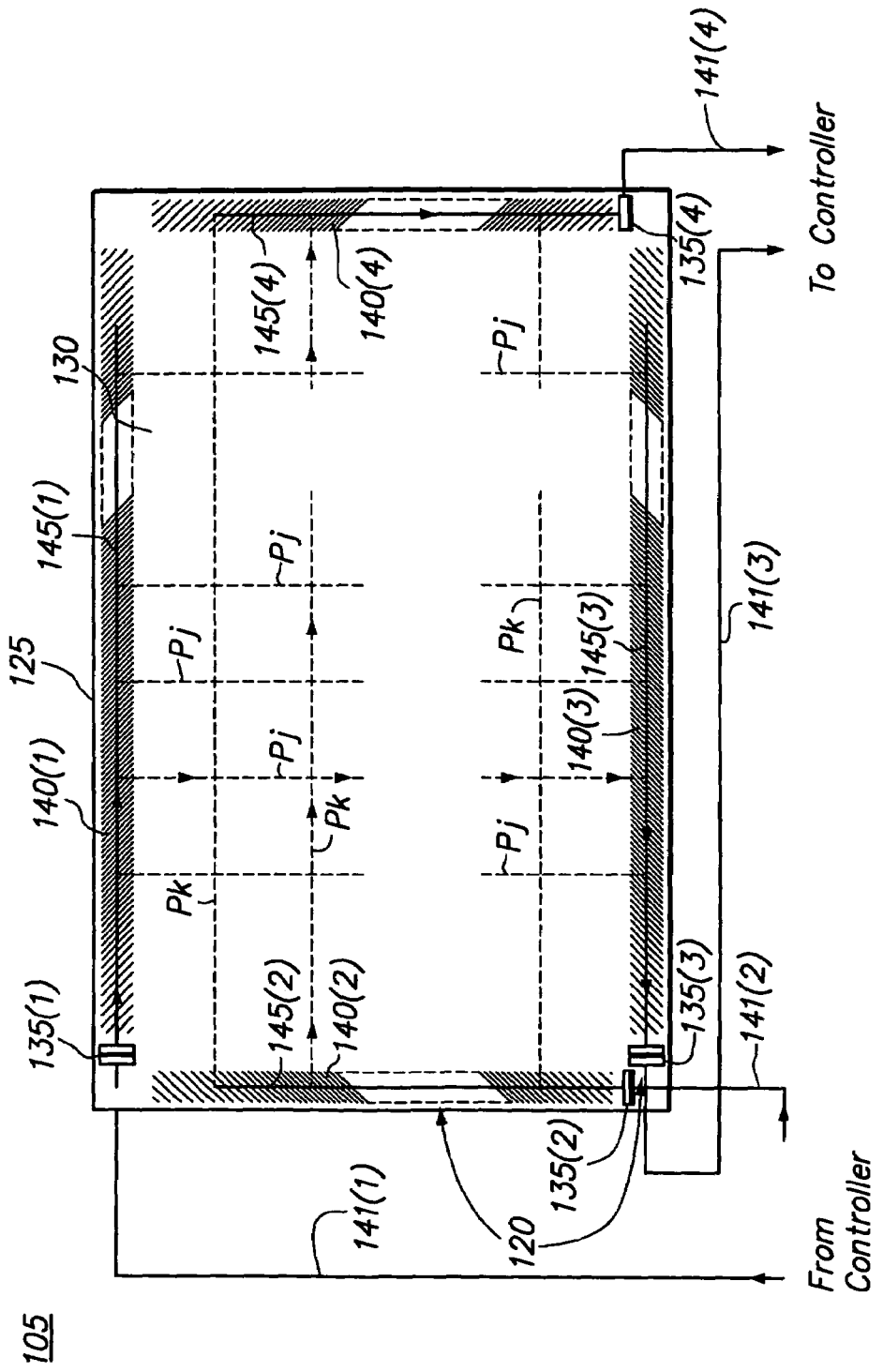
FIG. 4 is a plan view of a touch sensor used in the system of FIG. 3.

Referring to FIGS. 3 and 4, a touchscreen system 100 constructed in accordance with a preferred embodiment of the present invention is described. The touchscreen system 100 generally comprises a touchscreen 105 (i.e., a touch sensor having a transparent substrate), a controller 110, and a lead 111 coupling the controller 110 to the touchscreen 105. In combination, the touchscreen 105 and controller 110 make up a touchscreen system, which is used in conjunction with a display device 115. The touchscreen system 100 has an operating frequency, and is configured to respond to a touch on the touchscreen 105 by causing acoustic signals to be transmitted across the touchscreen 105, one or more of which are modulated in the presence of the touch. The controller 110 in turn uses the modulated signal to identify the location on the touchscreen 105 where the touch occurred. If the controller 110 identifies a touch as valid, it transmits the touch's position to a host computer (not shown) that then implements a corresponding computer function to display the pertinent information, e.g., graphics, on the display device 115.

The display device 115 can take the form of any device that displays pertinent information to an observer. For example, in the illustrated embodiment, the display device 115 takes the form of a cathode ray terminal (CRT), and the displayed information can, for example, be graphics such as an icon or a menu or directory from which the user can choose options. In the illustrated embodiment, the touchscreen 105 is mounted on the display device 115 as a faceplate. Alternatively, the touchscreen 105 may be disposed over a preexisting faceplate of the display device 115, or the touchscreen 105 may be located remotely from the display device 115, such as, for example, as a tablet.

In any event, graphics or other information may be ordered up for display on the display device 115 in response to an operator's command, which can take the form of a touching of a particular area of the touchscreen 105. In alternative embodiments, a display device 115 need not be employed, such as when the display of graphics or other information is not required.

Whether it is mounted on a CRT faceplate or a separate panel, the touchscreen 105 comprises a substrate 125 with a surface 130 that can be touched by a user, and a transmit/receive assembly 120 that is disposed onto the substrate surface 130. The act of touching the surface 130 causes some of the acoustic wave energy to be absorbed by the touch, thus producing a perturbation of the surface wave propagating through the region of the touch. The perturbation is manifested as an interruption or reduction of the wave energy (i.e., a dip in the wave amplitude) directed along one or more paths that form an invisible XY grid overlaying the substrate surface 130. Detection and analysis of such a perturbation serves to identify the X and Y coordinates of the touched area, which information, in turn, is determinative of an output from the controller 110.

To this end, the controller 110 operates the transmit/receive assembly 120 in a predetermined sequence, so that when a touch induced perturbation of acoustic wave energy is detected, converted to an electrical signal, and fed back to the controller 110, the location of the touch, as well as the touch pressure employed to induce the perturbation, are identified by the controller 110 and converted to control signals containing information indicative of touch location and touch pressure. In performing its function, the controller comprises software, which when executed, performs the necessary steps to control and process the relevant signals. It should be noted, however, that the controller need not possess a computer, but can be totally implemented in hardware or firmware.

The transmit/receive assembly 120 comprises a pair of transmit or input transducers 135(1) and 135(2), a pair of receive or output transducers 135(3) and 135(4), and four reflective arrays 140(1)–(4). Both the transmit transducers 135(1) and 135(2) and the receive transducers 135(3) and 135(4) are piezoelectric transducers comprised of a suitable material such as, for example, lead zirconate titanate ceramic (lead titanate ceramic can also be used) mounted on a prism of lower velocity material, such as, for example, acrylic, which effects an efficient electromechanical coupling to the substrate surface 130. The transmit transducers 135(1) and 135(2) can be configured to transmit any one of the following types of waves: (1) horizontally polarized shear waves, including ZOHPS waves, HOHPS waves, and Love waves; and (2) acoustic waves with a longitudinal component, including Rayleigh-like waves and Lamb waves. The receive transducers 135(3) and 135(4) can be configured to receive any of the types of waves that the transmit transducers 135(1) and 135(2) can be configured to transmit. In the illustrated embodiment, the transducers 135 are shear mode transducers. It should be noted, however, that the transducers 135 can be pressure-mode transducers without straying from the principles taught by the invention. As illustrated in FIG. 4, the transducers 135 are distinct elements. However, it should be noted that it is possible for a single transducer to function as both a transmit and receive transducer. The specific structure of the transducers 135 will be described in detail below.

The transmit transducers 135(1) and 135(2) are operated under control of the controller 110, such that acoustic signals are generated and transmitted across the substrate surface 130. This is accomplished by applying electrical input firing signals via leads 141(1) and 141(2) to the respective transmitter transducers 135(1) and 135(2), which in turn convert the signals into mechanical energy, (a burst of acoustic waves) that traverse the substrate surface 130. The acoustic wave is propagated along axes 145(1) and 145(2) through reflective arrays 140(1) and 140(2) where it is reflected across the substrate surface 130 to reflective arrays 140(3) and 140(4) on the opposite side of the substrate surface 130. The wave is then reflected by the reflective arrays 140(3) and 140(4) along axes 145(3) and 145(4) to receive transducers 135(3) and 135(4) where it is converted back into electrical energy as output signals that contain the touch information via leads 141(3) and 141(4). The position characteristic is determined using the known speed and path of the acoustic wave in the substrate surface 130, the starting time of the wave, and the time at which the perturbation in the wave reaches the receiver transducer, either 135(3) or 135(4).

In the manner just described, and as depicted in FIG. 4, the surface 130 is provided with an invisible, overlaid grid comprising a multiplicity of intersecting paths of acoustic surface wave bursts which are confined to predetermined paths. One series of paths $p_j$ is disposed parallel to the vertical or minor axis of the display surface 130 to provide Y-coordinate information of a touch, while a second intersecting series of paths $p_k$ is disposed parallel to the horizontal or major axis of the surface 130 to provide X-coordinate information for the touch. Further details on the use this architecture to determine the positional coordinates of touches on a touchscreen are described in U.S. Pat. No. 4,644,100, which has been previously incorporated herein by reference.

As described above and as is well known in the art, the reflective arrays 140 must be carefully designed to define the desired operating frequency. In particular, the spacing along the propagation axis 145 of reflective elements of the reflective arrays 140 must be integer multiples of the acoustic wavelength to a high precision. The operating frequency of a touchscreen is easily determined from inspection of the reflective arrays 140 and a measurement of the acoustic wave velocity.

Figure 5A:
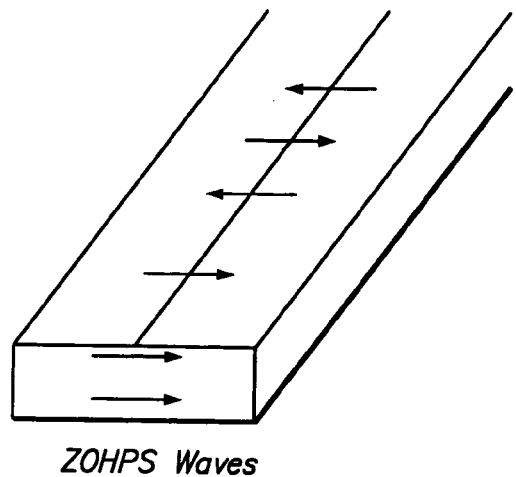
FIGS. 5(a)–(c) illustrate three types of horizontally polarized shear waves that can be propagated through touchscreen substrates such as the substrate used in the touch sensor of FIG. 4.
Figure 5B:
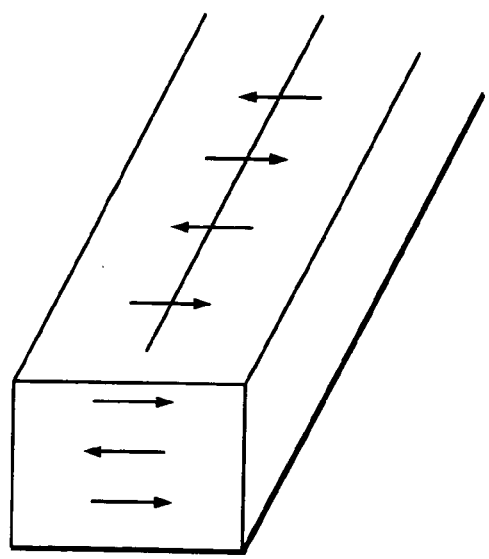
Figure 5C:
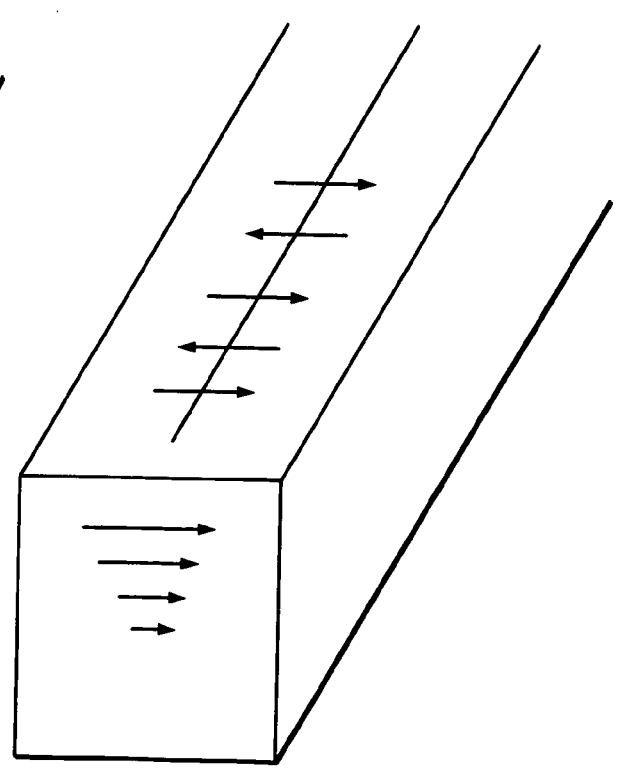

Having described the components on the substrate surface 130, and how they operate to determine the location of a touch, the discussion now turns to the structure of the substrate 125 itself. The substrate 125 can be constructed to support one or more of a variety of horizontally polarized shear waves. For example, FIGS. 5(a)–(c) illustrate three types of horizontally polarized shear waves: zero order horizontally polarized shear (ZOHPS) waves, higher order horizontally polarized shear (HOHPS) waves, and Love waves, respectively. In each case, particle motion is in the horizontal plane. These types of shear waves differ in their wave-amplitude depth profiles.

For example, the ZOHPS illustrated in FIG. 5(a) is a lowest order shear plate wave, the amplitude of which is independent of depth. Touchscreens using this ZOHPS wave are described and illustrated in U.S. Pat. Nos. 5,177,327 and 5,329,070, which are hereby incorporated by reference. Unlike acoustic touchscreens utilizing Rayleigh waves, ZOHPS wave touchscreens can properly reconstruct touch positions even in the presence of high levels of water contamination, including complete submersion of the touch surface under water.

The HOHPS wave illustrated in FIG. 5(b) is a shear plate wave mode with $n \geq 1$, where n is the number of node planes of zero amplitude. In FIG. 5(b), the HOHPS exhibits a wave amplitude that varies sinusoidally with depth, and has two node planes of zero amplitude between the top and bottom surface, i.e., n=2. For an operating frequency near 5 MHz, mode separation issues restrict the use of the ZOHPS to glass substrates not thicker than about 1 mm. For other operating frequencies, the maximum substrate thickness is scaled inversely with the chosen operating frequency, e.g., not thicker than about ½ mm for a 10 MHz operating frequency. For an operating frequency of near 5 MHz, use of the HOHPS mode instead of the ZOHPS mode allows the touchscreen designer to increase the thickness of the glass substrate to at least 2 or 3 mm and still avoid mode mixing problems.

Figure 6:
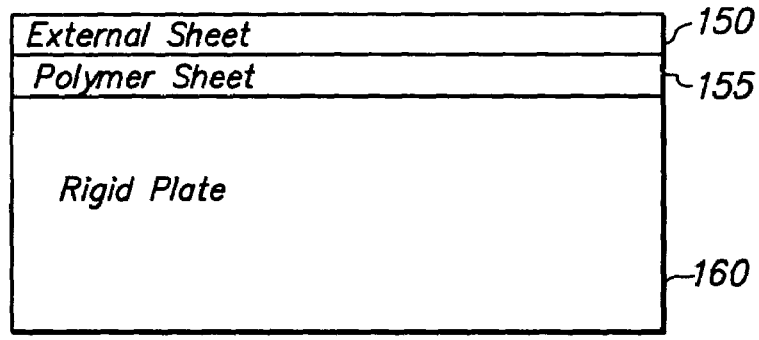
FIG. 6 is a side view of one preferred embodiment of the substrate used in the touch sensor of FIG. 4.

The Love wave illustrated in FIG. 5(c) is a horizontally polarized shear wave having wave energy at one surface of the substrate and substantially less energy on the opposing surface. Like a Rayleigh wave, a Love wave is bound to the touch surface and decays in an exponential fashion with depth. Unlike a Rayleigh wave, however, a Love wave does not exist in a homogenous medium. Mathematically, the simplest substrate supporting a Love wave is a surface layer of finite thickness bonded to a semi-infinite medium exhibiting a faster bulk shear wave velocity. Practically speaking, the semi-infinite medium may be a layer of finite thickness provided it is thick enough to contain a large number of exponential decay lengths of the wave amplitude. For example, the substrate 125 shown in FIG. 6 comprises (1) an external thin sheet 150 generally composed of a shear wave supporting, hard, and scratch-resistant material; (2) an intermediate polymer sheet 155 composed of a suitable polymer; and (3) a rigid plate 160 composed of a shear wave supporting material having a low acoustic attenuation. These three layers are bonded together using a lamination process to form a multi-layer substrate.

Preferably, Love wave substrates are designed to have low frequency dispersion of Love wave group velocity as a function of frequency for the touchscreen's operating frequency. Further details regarding the manufacture of Love wave supporting substrates are disclosed in U.S. Pat. Nos. 5,329,070 and 5,591,954 and U.S. Pat. application Ser. No. 09/972,788, which are expressly incorporated herein by reference.

Figure 7A:
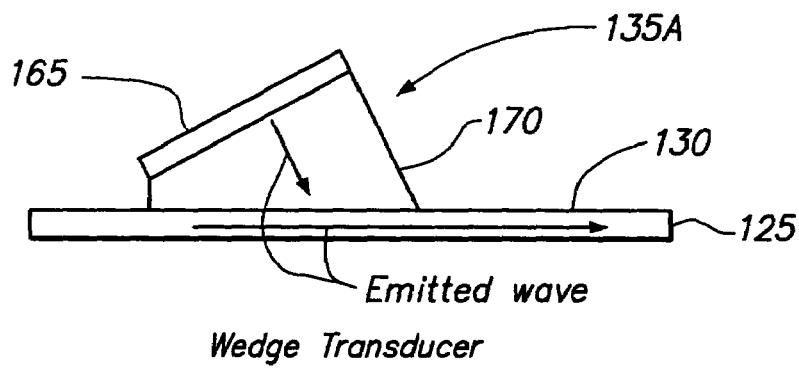
FIGS. 7(a)–(c) show three types of transducers that can be used to transmit and receive horizontally polarized shear waves within the substrate used in the touch sensor of FIG. 4.
Figure 7B:
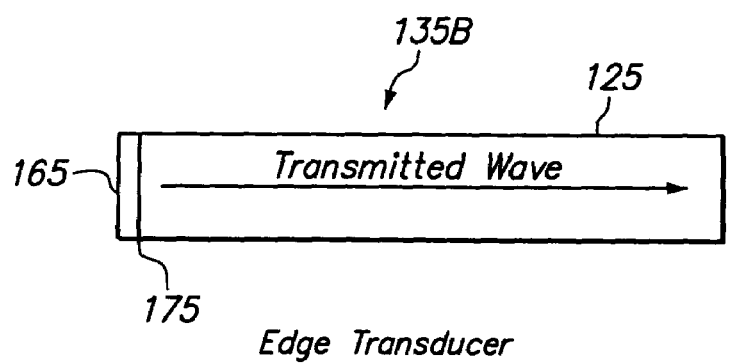
Figure 7C:
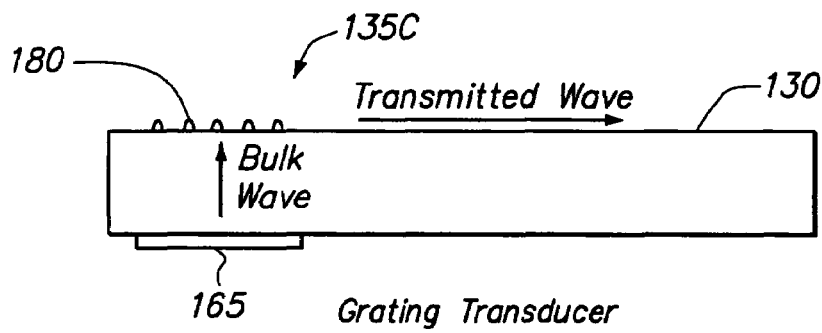

Having considered various possible structures for the acoustic substrate 125, the construction of the transducers 135 will now be discussed. Each of the transducers 135 comprises a piezoelectric element 165 and can be variously constructed in order to propagate Love waves through the substrate 125. For example, a transducer 135 can be constructed as a wedge, edge, or grating transducer, as illustrated in FIGS. 7(a)–(c). FIG. 7(a) shows a wedge transducer 135(a), so called because it comprises a wedge 170 on which the piezoelectric element 165 is mounted, which in turn is mounted on the substrate surface 130. When an electric signal is transmitted to the piezoelectric element 165, it is converted into an acoustic wave that is propagated through the wedge shaped base 170, into the substrate 125, and is then propagated horizontally through the substrate 125 as indicated by the arrows. FIG. 7(b) shows an edge transducer 135(b), so called because the piezoelectric element 165 is mounted on an edge 175 of the substrate 125. When an electric signal is transmitted to the piezoelectric element 165, it is converted into an acoustic wave that is propagated horizontally through the substrate 125 as indicated by the arrow. FIG. 7(c) illustrates a grating transducer 135(c), so called because it comprises a grating 180 mounted on the substrate surface 130. The piezoelectric element 165 is mounted on the other side of the substrate 125 opposite the substrate surface 130. When an electric signal is transmitted to the piezoelectric element 165, it is converted into a bulk acoustic wave that is propagated through the substrate 125 to the grating 180, and is then transmitted horizontally through the substrate 125 as indicated by the arrow.

Figure 8:
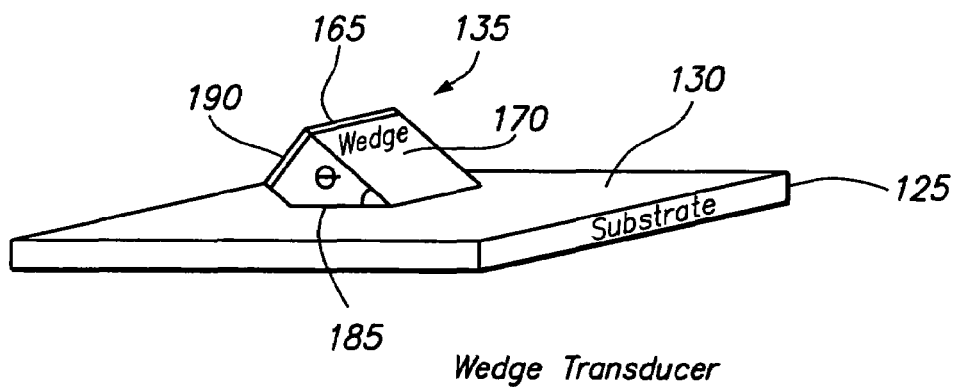
FIG. 8 is a side view of one preferred embodiment of a third-order harmonic transducer mounted on the substrate used in the touch sensor of FIG. 4.

Referring now to FIG. 8, the transducers 135 will now be described in further detail as wedge transducers. The wedge 170 is preferably composed of plastic, and includes a hypotenuse side 185, and a side 190 opposite a wedge angle of inclination θ. The piezoelectric element 165 is mounted to the opposite side 190 of the wedge 170. The transducer 135 is attached at its hypotenuse side 185 to the substrate surface 130, i.e., the transducer 135 is operably connected to the substrate 125. The piezoelectric element 165 is a shear wave mode element. In transmit mode, the piezoelectric element 165 launches a bulk shear wave into the wedge 170 material. The wedge angle θ is related to the wedge 170 material's bulk shear (i.e., transverse) wave velocity, $V_T$, and the Love-wave phase velocity, $V_p$, in the standard manner:

$$\cos(\theta) = \frac{V_T}{V_p}.$$

As a non-limiting example to illustrate this relationship, consider the three-layer substrate 125 embodiment, where the thin sheet 150 is, for example, a 100 micron thick borosilicate glass, the polymer sheet 155 is a 32 micron thick sheet of polystyrene, and the plate 160 is a 3 mm thick sheet of soda-lime glass. The Love wave phase velocity in this substrate 125 at 5.53 MHz is approximately 3.13 mm/μsec. The bulk shear wave velocity in the wedge 170 material must be less than this value. For example, a wedge 170 constructed from Styron® 666 polystyrene manufactured by Dow Plastics has a shear wave velocity of about 1.15 mm/μsec. Therefore, a suitable wedge 170 for this substrate 125 should be constructed with a wedge inclination angle of $$\theta \approx \text{Arccos}\left(\frac{1.15}{3.13}\right) \approx 68^0.$$

As previously stated, conventional shear mode piezoelectric elements are typically made with the relatively expensive, but strong lithium niobate. In order to be able to use the less expensive, but more fragile ceramic materials, such as lead zirconium titanate and lead titanate, the piezoelectric element 165 is designed so that at least one of the higher order resonant frequencies of the acoustic wave generated by the piezoelectric element 165, preferably one of the higher order odd resonant frequencies, and more preferably the third order resonant frequency, is substantially equal to the operating frequency of the system 100. When the order is 2n+1, the piezoelectric element is referred to as a $(2n+1)^{st}$ order harmonic piezo. Thus, for example, when the order is three, the piezoelectric element is a 20 third order harmonic piezo. The fundamental or lowest resonance may also be referred to as the first harmonic. It has one node plane in the middle in which there is no motion. The resonance used in the present embodiment has three node planes. The number of node planes is the harmonic order of the resonance.

Figure 9A:
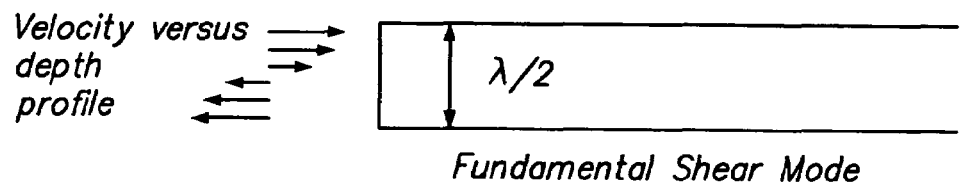
FIGS. 9(a)–(c) are diagrams that illustrate the acoustic behavior of the piezoelectric element in the transducer used in the touch sensor of FIG. 4.
Figure 9B:
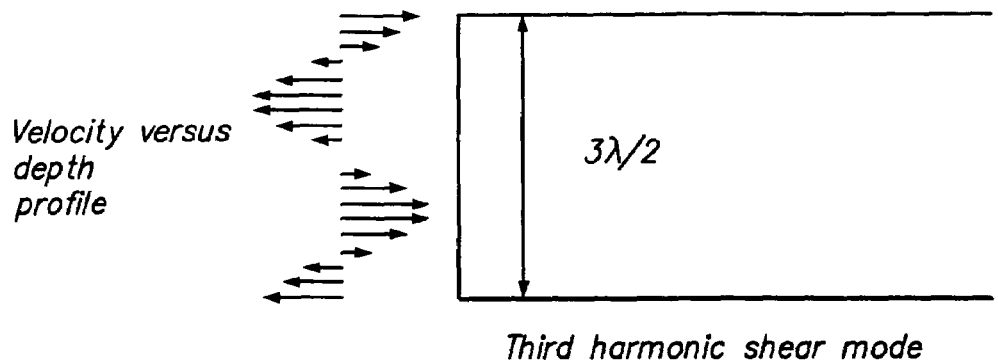

The difference between conventional shear mode piezoelectric transducers and third order harmonic piezoelectric transducers is illustrated in FIGS. 9(a) and (b). FIG. 9(a) shows the velocity versus depth profile for a fundamental or lowest resonance frequency piezoelectric element (known as a first harmonic piezoelectric element), while FIG. 9(b) shows the profile for a third harmonic piezoelectric element. Going from the first to the third harmonic changes the piezoelectric thickness formula to $$T = \frac{3\lambda}{2} = \frac{3V}{2f} = \frac{3N}{f}.$$

The extra factor of three means that the piezoelectric transducer can be made much thicker, so that the cheaper lead zirconium titanate and lead titanate ceramics can be used.

Figure 9C:
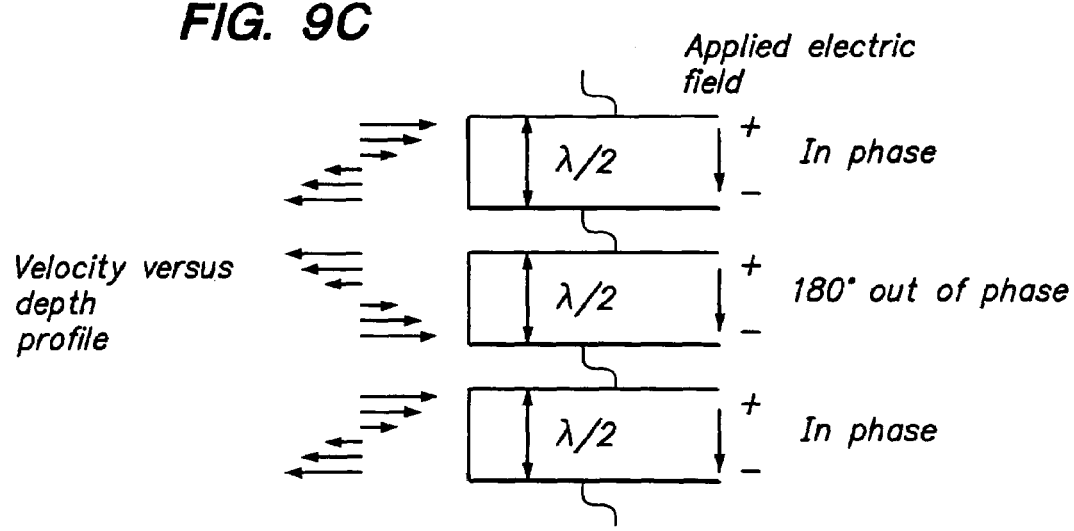

Electronically, a $(2n+1)^{st}$ order harmonic piezoelectric element can be thought of as equivalent to 2n+1 first order harmonic piezoelectric elements electrically connected in series. In other words, the harmonic order is also the number of fundamental mode piezoelectric elements that are conceptually stacked on top of each other to form higher order harmonic piezoelectric elements. For example, FIG. 9(c) shows the case of a third order harmonic piezoelectric element as a series of three first order harmonic piezoelectric elements. In the middle third of the third harmonic piezoelectric transducer, the applied electric field from the tone burst is 180° out of phase with respect to that needed to excite the desired shear motion of the third harmonic resonance, suggesting that instead of helping, there is active cancellation of half of the shear mode excitation from the remainder of the transducer. Surprisingly, however, and as is detailed below, the actual performance of such a transducer made with PZT is significantly better than a first harmonic lithium niobate piezoelectric transducer.

Since the discussion has focused on the behavior of odd order harmonic piezoelectric elements, it is natural to ask what happens when the harmonic order is even. In that case, the material is split exactly 50—50 between the materials excited with opposite phases, and hence there is no net electromechanical coupling between the applied electronic signal and the mode of shear vibration. Therefore, it is preferred to use odd order harmonics rather than even order harmonics.

Figure 10:
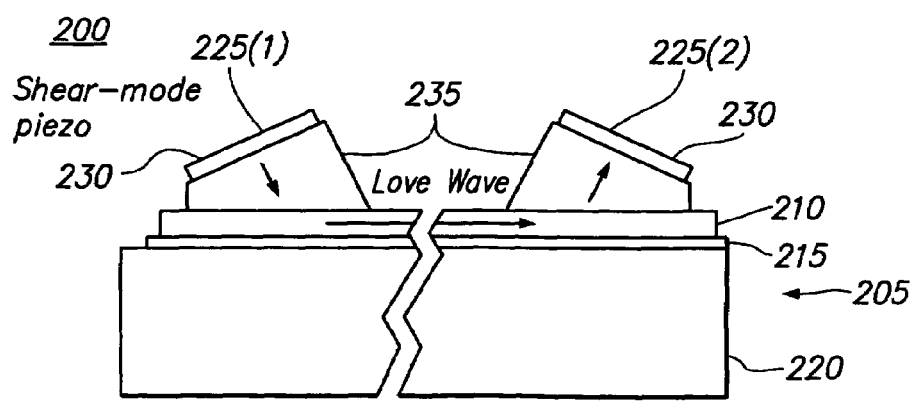
FIG. 10 is a side view of a test system used for testing the properties of the transducer of FIG. 8.

Actual performance of this phenomenon has been experimentally proved using a test system 200, as illustrated in FIG. 10. The test system 200 comprises a Love wave supporting three layer substrate 205 having a 200 μm glass thin sheet 210, a 32 μm layer of polystyrene film 215 on which the thin sheet 210 is bonded, and a 3 mm thick glass plate 220 on which the polystyrene film 215 is bonded. The test system further comprises a transmit-receive wedge transducer pair 225 having piezoelectric elements 230 formed of 2 mm×14 mm rectangular lead zirconium titanium (PZT) slabs and wedges 235 on which the piezoelectric elements 230 are mounted. The wedges 235 are composed of acrylic and have wedge angles that are designed to support coherent refraction of a bulk shear wave in the acrylic, to the horizontally propagating Love wave in the substrate 205. The transmit and receive piezoelectric elements 230 are separated by approximately 200 mm.

Using the system 200, the following experiment was performed. Five radio frequency (RF) cycle long tone bursts at 5.53 MHz and a nominal 10 V amplitude were generated with a function generator with a 50Ω output impedance. This signal excited the transmit transducer 225(1). The receive transducer 225(2) was connected to an oscilloscope input set for a 50Ω load impedance. Signals due to Love wave pulses were identified by the absorption characteristics of the Love wave: unaffected by water, sensitive to finger touch, insensitive to any material in contact with the back surface of the laminated substrate, and having a delay time consistent with the known Love wave group velocity. The maximum peak-to-peak voltage of the Love wave signals was measured. In the measurements described below, the largest amplitude signal observed was indeed the desired Love wave pulse. Measurements were performed at the third harmonic resonant frequency of the piezoelectric elements 230.

Figures 11, 14:
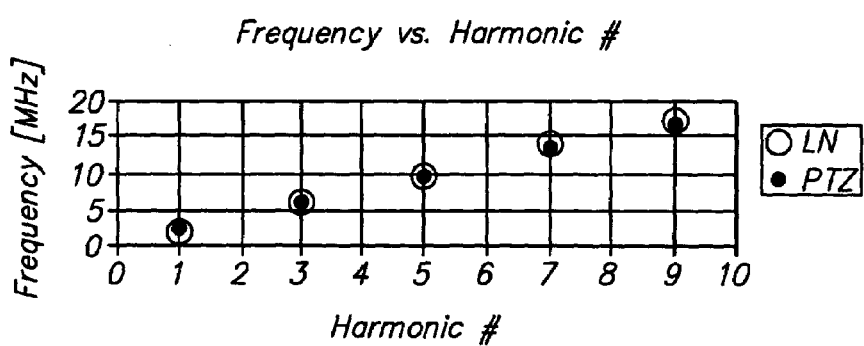
FIG. 11 is a table comparing the behavior of a lithium niobate first order harmonic piezoelectric element with the behavior of the piezoelectric element of the FIG. 8 transducer.
FIG. 14 is a chart setting forth the frequencies at which the odd numbered harmonics of the respective transducers of FIGS. 12 and 13 are located.

For comparison, the experiment was also performed using lithium-niobate piezoelectric elements of conventional design at their fundamental resonance frequency. The results are given in the table in FIG. 11. As can be seen in that table, not only was a signal observed from the transducer pair constructed using third harmonic PZT piezoelectric elements, but the signal was larger (69 mV) than that for conventional first-harmonic lithium niobate piezoelectric elements (47 mV). Thus even electronically, third harmonic PZT piezoelectric elements can be an attractive alternative to lithium niobate piezoelectric elements. Hence, PZT and lead titanate ceramic piezoelectric transducers that have a third harmonic frequency equal to the operating frequency of the system 100 are both cheaper and more efficient than shear mode first harmonic lithium niobate piezoelectric transducers. Moreover, since third order harmonic ceramic piezoelectric elements can be made thicker than first order harmonic ceramic piezoelectric elements, they do not have the fragility problem that has, in the past, led to the choice of lithium niobate elements over ceramic elements.

Figure 12:
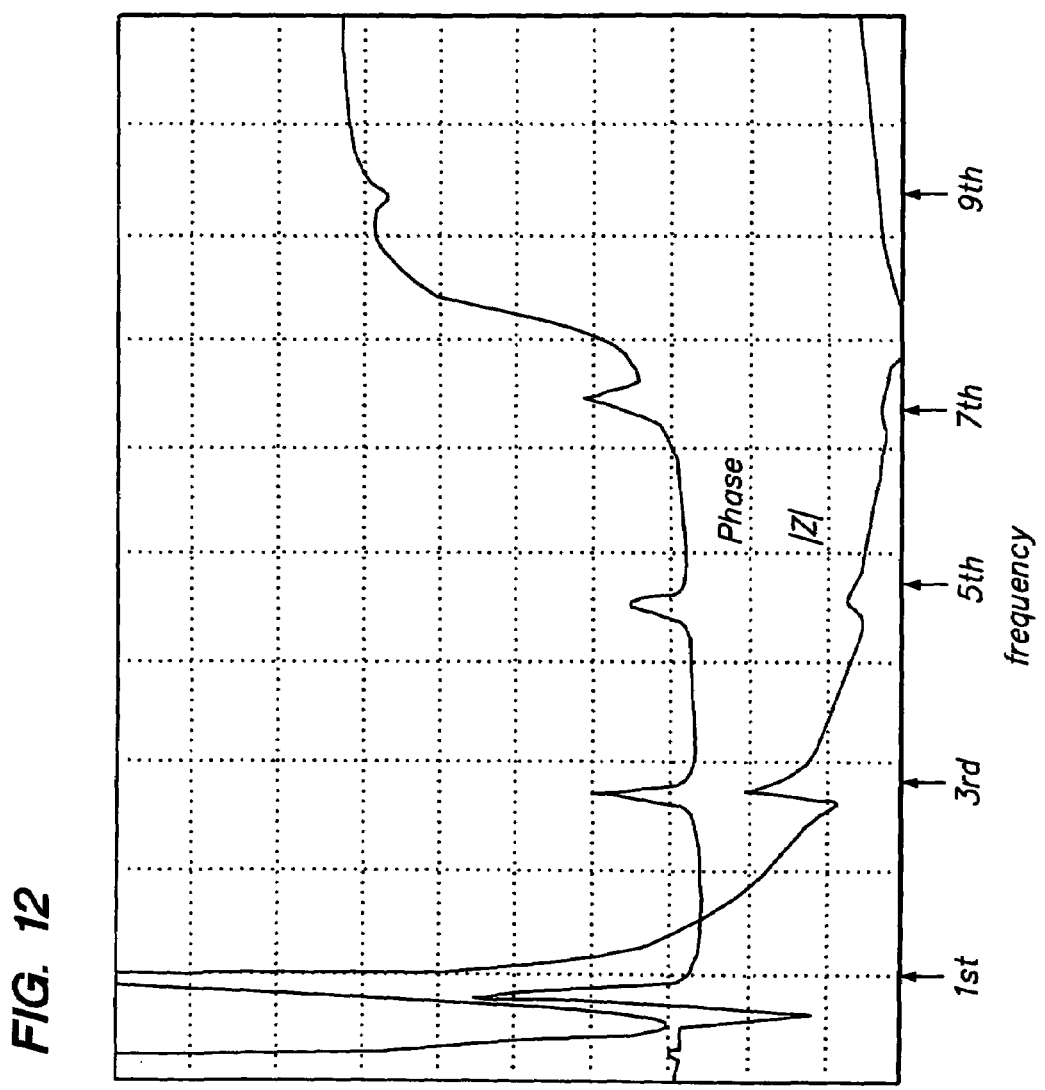
FIG. 12 is a frequency response plot of the transducer of FIG. 8, wherein the piezoelement of the transducer is particularly composed of PZT material.
Figure 13:
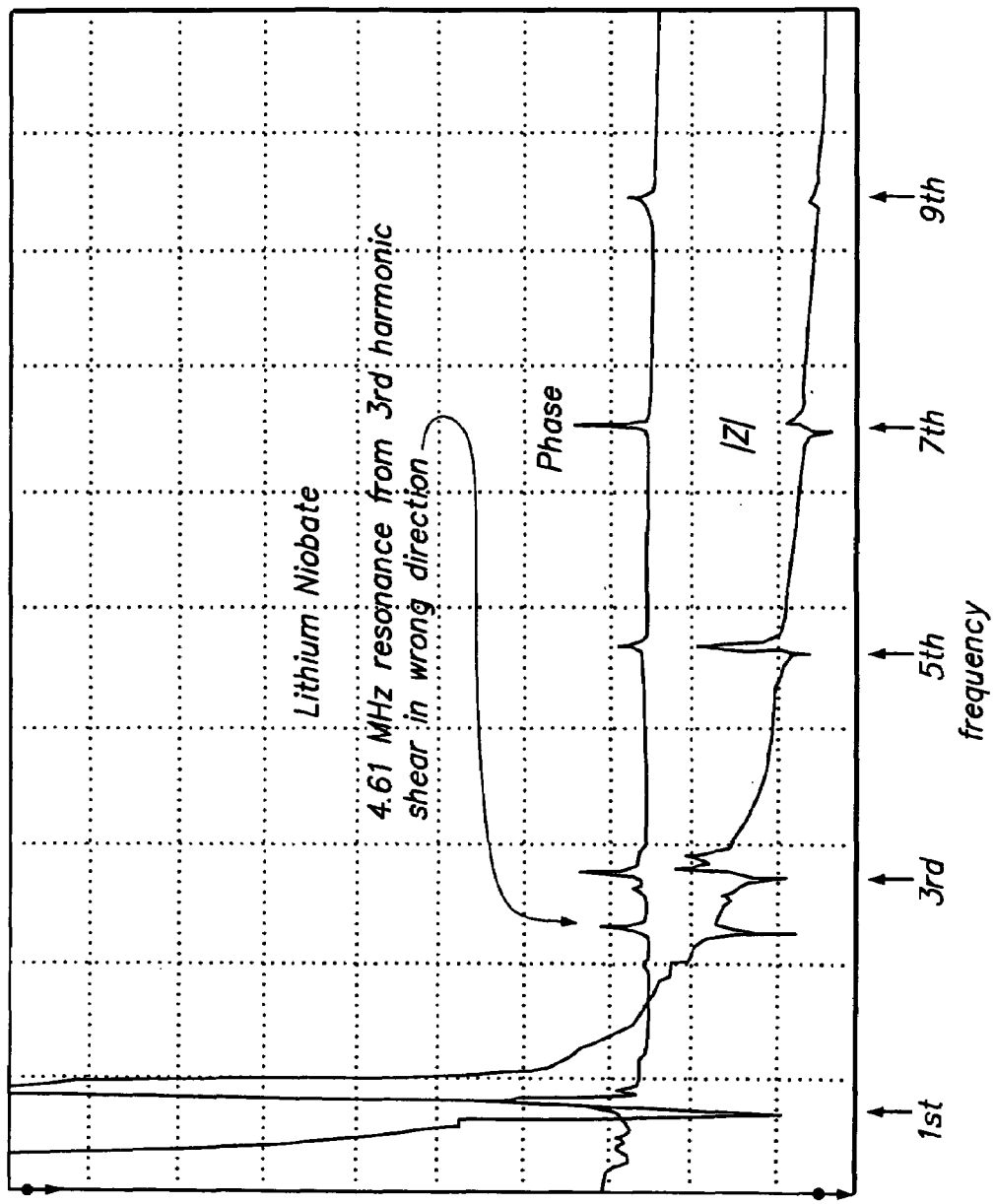
FIG. 13 is a frequency response plot of the transducer of FIG. 8, wherein the piezoelement of the transducer is particularly composed of lithium niobate material.

FIGS. 12 and 13 illustrate the frequency responses of the respective PZT and lithium niobate third-harmonic piezoelectric elements in the form of impedance and phase plots taken from 0 MHz to 20 MHz. The plots show the first five odd order harmonics (i.e., the first, third, fifth, seventh, and ninth) for the respective piezoelectric elements. Even harmonics are not seen on the plots, since as previously discussed, there is no net electromechanical coupling for even harmonics. As can be seen from the plots, the higher order odd harmonics become progressively weaker, since as the order 2n+1 increases, the fraction $$\frac{1}{2n+1}$$

(the fraction of the piezoelectric element material that effectively couples to the applied oscillating voltage) decreases. When the third harmonic provides enough mechanical strength at the operating frequency, it is the preferred harmonic. The higher odd harmonics are useful if further mechanical strength is needed. For example, fifth and seventh order resonance frequencies can be used, making possible even thicker piezoelectric transducers.

FIG. 13 sets forth the frequencies at which the odd harmonics are observed for both PZT and lithium niobate piezoelectric elements. As can be seen from this chart, the two types of elements exhibit the same behavior, i.e., the odd harmonics occur at essentially the same frequencies for both types. The plots of FIGS. 12 and 13 illustrate an important difference between the two types of elements. At 4.61 MHz, lithium niobate piezoelectric elements exhibit a shear motion that is perpendicular to the desired shear direction, which is manifested in the lithium niobate impedance plot of FIG. 13 as a vertical spike. The slightly lower frequency is due to a slower shear wave velocity for shear waves with the wrong polarization. Lithium niobate piezoelectric elements designed for the first harmonic also have such a parasitic wrong-polarization mode slightly below the main first harmonic resonance. This wrong direction shear resonance is not present in the PZT impedance plot of FIG. 12, thus indicating that unlike the lithium niobate piezoelectric element, the PZT piezoelectric element will not generate Rayleigh-like parasitic modes. Thus, experimental observations reveal another benefit of third harmonic PZT shear mode piezoelectric elements over conventional lithium-niobate piezoelectric elements: PZT piezoelectric elements eliminate the troublesome coupling of the transducer to acoustic waves with a longitudinal component—even when third harmonics are used with both types of elements.

For operating frequencies near 5 MHz that are typical of current acoustic touchscreen products, use of third-harmonic piezoelectric elements solves the fragileness problem associated with shear-mode piezoelectric elements. Emerging markets for smaller touchscreens in handheld computer applications may well motivate use of higher operating frequencies, and thus create a fragileness problem even for pressure-mode PZT piezoelectric elements. For this reason, use of third-harmonic pressure-mode piezoelectric elements is also relevant for touchscreen technology.

Although the above discussion has been set forth in the context of an acoustic touchscreen system 100, it applies to the more general setting of an acoustic-based system. This includes other types of touch sensors (e.g., opaque touch pads or touch sensitive robot shells) or any ultrasonic device in which it is desirable transmit and receive acoustic waves propagating along surfaces. A variety of sensors with sensitive surfaces can be imagined, as well as non-destructive testing applications. Indeed, the acoustic touchscreen system 100 is really just a special case of an acoustic-based system, where the acoustic substrate 125 is specifically designed to operate in the touchscreen 105. Thus, the present discussion, in its broadest aspects, should be thought of as applying in that more general setting.

Although particular embodiments of the present invention have been shown and described, it should be understood that the above discussion is not intended to limit the present invention to these embodiments. Those of ordinary skill in the art will appreciate that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A touch sensor having an operating frequency, comprising:

a touch sensitive substrate; and a piezoelectric element operably coupled to the substrate, wherein the piezoelectric element is characterized by a higher order odd resonant frequency approximately equal to the operating frequency, the higher order frequency being selected from a frequency consisting of a third, fifth, and seventh order resonant frequency.

2. The touch sensor of claim 1, wherein the higher order resonant frequency is a third order resonant frequency.

3. The touch sensor of claim 1, wherein the piezoelectric element is a shear-mode piezoelectric element.

4. The touch sensor of claim 3, wherein the piezoelectric element is configured for transmitting or receiving a horizontally polarized acoustic shear wave in the substrate.

5. The touch sensor of claim 4, wherein the shear wave is selected from a wave consisting of a Love wave, a Zero Order Horizontally Polarized Shear (ZOHPS) wave, and a Higher Order Horizontally Polarized Shear (HOPS) wave.

6. The touch sensor of claim 1, wherein the piezoelectric element is a pressure-mode transducer.

7. The touch sensor of claim 6, wherein the piezoelectric element is configured for transmitting or receiving an acoustic wave having a longitudinal component in the substrate.

8. The touch sensor of claim 7, wherein the wave is selected from a wave consisting of a Rayleigh wave and a Lamb wave.

9. The touch sensor of claim 1, wherein the substrate is transparent.

10. The touch sensor of claim 1, wherein the substrate is opaque.

11. The touch sensor of claim 1, further comprising an acoustic transmit/receive assembly operably coupled to the substrate for transmitting and receiving acoustic waves along at least one set of parallel paths.

12. A method of sensing touches on a touch sensor, comprising:

transmitting an acoustic wave across an acoustic substrate with a piezoelectric element, the acoustic wave having a frequency approximately equal to a higher order odd resonant frequency of the piezoelectric element, the higher order frequency being selected from a frequency consisting of a third, fifth, and seventh order resonant frequency;

receiving the acoustic wave from the substrate; and processing the acoustic wave at the higher order odd resonant frequency to determine whether the substrate has been touched.

13. The method of claim 12, wherein the higher order odd resonant frequency is a third order resonant frequency.

14. The method of claim 12, wherein the acoustic wave is a horizontally polarized acoustic shear wave.

15. The method of claim 14, wherein the shear wave is selected from a wave consisting of a Love wave, a Zero Order Horizontally Polarized Shear (ZOHPS) wave, and a Higher Order Horizontally Polarized Shear (HOHPS) wave.

16. The method of claim 12, wherein the acoustic wave is an acoustic wave with a longitudinal component.

17. The method of claim 16, wherein the wave is selected from a wave consisting of a Rayleigh wave and a Lamb wave.

18. The method of claim 12, wherein the substrate is transparent.

19. The method of claim 12, wherein the substrate is opaque.

20. The method of claim 12, further comprising processing the acoustic wave at the higher order odd resonant frequency to determine the location on the substrate that is touched.

* * * * *